United States Patent
Gu et al.

(10) Patent No.: US 10,519,065 B2
(45) Date of Patent: Dec. 31, 2019

(54) LIGHTWEIGHT MICRO-CLOSED-PORE CORUNDUM COMPOSITE REFRACTORY, METHOD FOR PREPARING THE SAME

(71) Applicant: Wuhan University of Science and Technology, Wuhan (CN)

(72) Inventors: Huazhi Gu, Wuhan (CN); Ao Huang, Wuhan (CN); Lvping Fu, Wuhan (CN); Meijie Zhang, Wuhan (CN); Nan Li, Wuhan (CN)

(73) Assignee: Wuhan University of Science and Technology, Wuhan (CN)

( * ) Notice: Subject to any disclaimer, the term of this patent is extended or adjusted under 35 U.S.C. 154(b) by 0 days.

(21) Appl. No.: 15/773,087

(22) PCT Filed: Dec. 16, 2015

(86) PCT No.: PCT/CN2015/097607
§ 371 (c)(1),
(2) Date: May 2, 2018

(87) PCT Pub. No.: WO2017/075865
PCT Pub. Date: May 11, 2017

(65) Prior Publication Data
US 2018/0319710 A1    Nov. 8, 2018

(30) Foreign Application Priority Data
Nov. 6, 2015  (CN) .......................... 2015 1 0751098

(51) Int. Cl.
| C04B 35/111 | (2006.01) |
| C04B 35/101 | (2006.01) |
| C04B 38/06 | (2006.01) |
| C04B 38/00 | (2006.01) |
| C04B 111/00 | (2006.01) |

(52) U.S. Cl.
CPC .......... *C04B 35/111* (2013.01); *C04B 35/101* (2013.01); *C04B 38/0054* (2013.01); *C04B 38/0061* (2013.01); *C04B 38/067* (2013.01); *C04B 38/0645* (2013.01); *C04B 2111/0087* (2013.01); *C04B 2111/00431* (2013.01); *C04B 2235/321* (2013.01); *C04B 2235/3217* (2013.01); *C04B 2235/5436* (2013.01); *C04B 2235/5445* (2013.01); *C04B 2235/5454* (2013.01); *C04B 2235/602* (2013.01); *C04B 2235/606* (2013.01); *C04B 2235/6567* (2013.01); *C04B 2235/77* (2013.01); *C04B 2235/9669* (2013.01)

(58) Field of Classification Search
CPC . C04B 35/111; C04B 35/101; C04B 38/0054; C04B 38/067; C04B 38/0061; C04B 2235/77; C04B 2235/606; C04B 2235/5454; C04B 2235/5445; C04B 2235/602; C04B 2235/9669; C04B 2235/5436; C04B 2235/321; C04B 2235/6567; C04B 2235/3217
See application file for complete search history.

(56) References Cited

U.S. PATENT DOCUMENTS

| 4,528,099 A | * | 7/1985 | Rieger | ............... B01D 39/2075 210/489 |
| 2011/0111990 A1 | * | 5/2011 | Pershikova | ............. C04B 35/01 507/219 |
| 2011/0277951 A1 | * | 11/2011 | Morikawa | ............ B22D 41/505 164/488 |
| 2017/0113972 A1 | * | 4/2017 | Zhang | ................. C04B 33/1305 |

FOREIGN PATENT DOCUMENTS

| CN | 102659426 | | 9/2012 |
| CN | 103896618 | | 7/2014 |
| CN | 104177099 | | 12/2014 |
| CN | 104446543 | | 3/2015 |
| CN | 104446543 A | * | 3/2015 | ............. C04B 35/66 |

* cited by examiner

*Primary Examiner* — Noah S Wiese
(74) *Attorney, Agent, or Firm* — Jason P. Mueller; Adams and Reese, LLP

(57) ABSTRACT

A lightweight micro-closed-pore corundum composite refractory and a method preparing the same, wherein raw materials of the refractory comprise 95-99 parts by weight of α-$Al_2O_3$ micro-powder and 1-5 parts by weight of dolomite clinker; and additives of the refractory comprise 2-15 parts by weight of nano alumina sol, 5-15 parts by weight of a carbohydrate polymer, and 30-50 parts by weight of an organic alcohol. and the lightweight micro-closed-pore corundum composite refractory is prepared by: mixing and wet grinding the raw materials and the additives to obtain a slurry; placing the slurry in a mold, keeping the mold at 15-25° C. for 6-12 hours and then keeping the mold at 60-90° C. for 6-12 hours, then demolding; drying a demolded green body at 110-200° C. for 24-36 hours, and keeping the green body at 1800-2000° C. for 2-5 hours. A method preparing a lightweight micro-closed-pore corundum composite refractory is also provided. The lightweight micro-closed-pore corundum composite refractory of the present invention has characteristics of low bulk density, small average pore size, high closed porosity, low thermal conductivity, strong thermal shock resistance, abrasion resistance and slag resistance.

7 Claims, No Drawings

LIGHTWEIGHT MICRO-CLOSED-PORE CORUNDUM COMPOSITE REFRACTORY, METHOD FOR PREPARING THE SAME

TECHNICAL FIELD

The invention relates to a corundum refractory and a method for preparing the same, particularly to a lightweight micro-closed-pore corundum composite refractory and a method for preparing the same.

BACKGROUND

Steel is the foundation of the state industry. Ladle is an important equipment for the storage, transportation, and refining of molten steel. Almost all new steel types are developed through secondary refining in ladle. Refractory is not only lining material, but also reactive in the metallurgical process, so it is one of the important sources of non-metallic inclusions and harmful elements in the steel, and also the main channel for energy consumption in the iron and steel smelting process. Therefore, refractory has become a key link in the modern steel smelting process.

At present, the destruction of the refractory is mainly manifested as slag corrosion damage, and there are more factors that affect the slag corrosion damage of the ladle refractory in comparison with other refractories. In theory, once contacted with the refractory, the slag will firstly penetrate the refractory through the pores of the refractory having a large specific surface area and a small pore size, where oversaturation (threshold value) is easily reached for forming new compounds. As more high-melting compounds are formed by reaction, the adhesion of the compound will increase the surface roughness of the refractory and intensify the penetration, which in turn results in more high-melting compounds to be formed, then a cycle is formed, and finally the boundary layer between the refractory and the slag is thickened; as less high-melting compounds are formed by reaction, that is, more low-melting compounds are formed, then the surface roughness is reduced and the penetration is weakened, and if the slag is flowing at this time, then the slag cannot always reach the oversaturation, as a result of which, the refractory will continue to dissolve into the slag, which results in aggravating the damage to the refractory. A large number of studies have shown that during the service of alumina-magnesia spinel materials, the spinel captures FeO, MnO of the slag, the corundum absorbs CaO of the slag to form a dense layer of calcium hexaaluminate (abbreviated as $CA_6$) on its surface, and viscosity of the slag increases due to the relative increase of $SiO_2$ content. Therefore, the slag penetration resistance and the corrosion resistance of the refractory are enhanced. Zhang Dianjun etc. have studied the erosion behavior of corundum-spinel castables under the condition of refining slags with two different basicity. The results showed that the corrosion of castables under the condition of high basicity slag was slight, and that the penetrate reaction layer of castables under the condition of low basic slag is thicker. It shows that there is a big difference of slag resistance of inner lining material under different smelting conditions such as slag systems, slag compositions and steel types. Especially for lightweight refractory, the process of slag erosion is more complex due to lower bulk density, more pores, and more slag diffusion channels. It is required that the lightweight refractory has more micro-closed pores and the ability to form a slag-resistant protective layer under the condition of a wide range of slag composition, however the lightweight refractory currently reported is still difficult to meet the requirements. Therefore, it is of important practical significance and application value to develop a lightweight refractory with strong slag-resistance in order to reduce the refractory consumption of ladle, save energy, improve metallurgical production efficiency and steel quality.

SUMMARY

The present invention is intended to solve the technical problem by providing a lightweight micro-closed-pore corundum composite refractory with low bulk density, small average pore size, high closed porosity, low thermal conductivity, strong thermal shock resistance, and abrasion resistance, and capable of forming a slag-resistant protective layer under the condition of a wide range of slag composition, and a method preparing the same.

The technical solution of the present invention to solve the technical problems is: a lightweight micro-closed-pore corundum composite refractory, wherein raw materials of the refractory comprise 95-99 parts by weight of $\alpha$-$Al_2O_3$ micro-powder and 1-5 parts by weight of dolomite clinker; and additives of the refractory comprise 2-15 parts by weight of nano alumina sol, 5-15 parts by weight of carbohydrate polymer, and 30-50 parts by weight of organic alcohol; and the lightweight micro-closed-pore corundum composite refractory is prepared by: mixing and wet grinding the raw materials and the additives to obtain a slurry; placing the slurry in a mold, keeping the mold at 15-25° C. for 6-12 hours and then keeping the mold at 60-90° C. for 6-12 hours, then demolding; drying a demolded green body at 110-200° C. for 24-36 hours, and keeping the green body at 1800-2000° C. for 2-5 hours, then the lightweight micro-closed-pore corundum composite refractory is obtained.

Preferably, the $\alpha$-$Al_2O_3$ micro-powder has an $Al_2O_3$ content of >99.2% by weight (>99.2 wt %) and a particle size D50 of 0.5-3 μm.

Preferably, the dolomite clinker has a total content of MgO and CaO of >99 wt % and a particle size D50 of 2-7 μm.

Preferably, the nano-alumina sol has a dispersed phase content of >25 wt % and an average particle size of 20-50 nm.

Preferably, the carbohydrate polymer is one or two or more mixtures of dextrin, starch and chitin.

Preferably, the organic alcohol is one or two or more mixtures of ethanol, polyvinyl alcohol, and tert-butyl alcohol.

The technical solution of the present invention to solve the technical problems is: a method for preparing a lightweight micro-closed-pore corundum composite refractory, which comprises: mixing and wet-grinding raw materials comprising $\alpha$-$Al_2O_3$ micro-powder and dolomite clinker and additives comprising nano alumina sol, a carbohydrate polymer, and an organic alcohol for 0.1-1 hour to obtain a slurry; placing the slurry in a mold, keeping the mold at 15-25° C. for 6-12 hours and then keeping the mold at 60-90° C. for 6-12 hours, and demolding; drying a demolded green body at 110-200° C. for 24-36 hours, and keeping the green body at 1800-2000° C. for 2-5 hours, then the lightweight micro-closed-pore corundum composite refractory is obtained.

Preferably, a planetary ball mill is used for the wet grinding, and more preferably, the grinding ball of the planetary ball mill is a corundum ball.

The present invention takes advantages of the high temperature superplasticity of the nano-alumina sol to allow MgO introduced into the dolomite clinker to react with alumina in situ to form the magnesium aluminate spinel during the early stage of the sintering, which results in a stress in the in-situ phase that effectively promotes the superplasticity of the nano-alumina, which causes grain boundary to move rapidly and closes the holes before they are eliminated, thereby forming a large number of closed holes; and the fine magnesium aluminate spinel formed in situ can effectively dissolve Fe, Mn and other components in the slag, thereby the slag viscosity is increased and the penetration of Fe is reduced. In addition, CaO introduced into dolomite clinker can react with alumina in-situ to form calcium hexaaluminate in the middle stage of the sintering, resulting in a stress in the in-situ phase that facilitates the grain boundary movement. As the grain boundary moves, the large holes are divided into small pores; and the in-situ formed fine calcium hexaaluminate can act as a seed to induce the formation of calcium hexaaluminate, thereby a protective layer of dense high-melting point calcium hexaaluminate and the like can be formed around the aggregate under a wide range of slag composition conditions, to reduce the penetration of Ca and erosion of other slag components, improving the overall slag-resistance of the aggregate. As a result, the lightweight micro-closed-cell corundum composite refractory of the present invention has characteristics of low bulk density, small average pore size, high closed porosity, low thermal conductivity, strong thermal shock resistance, abrasion resistance and slag resistance.

It has been proved by experiments that the lightweight micro-closed pore corundum composite refractory prepared by the present invention has a bulk density of 2.75-3.05 g/cm$^3$, a ratio of closed porosity to total porosity of more than 55%, and an average pore size of 0.1-0.5 µm.

DETAILED DESCRIPTION OF THE EMBODIMENTS

The present invention will be further described with reference to the following embodiments.

Raw Materials

The $\alpha$-$Al_2O_3$ micro powder has an $Al_2O_3$ content of >99.2 wt % and a particle size D50 of 0.5-3 µm.

The dolomite clinker has a total content of MgO and CaO of >99 wt % and a particle size D50 of 2-7 µm.

The nano-alumina sol has a dispersed phase content of >25 wt % and an average particle size of 20-50 nm.

The grinding ball of the planetary ball mill is a corundum ball.

Example 1: Preparation for Lightweight Micro-Closed-Pore Corundum Composite Refractory The raw materials of the refractory comprise 95-97 parts by weight of $\alpha$-$Al_2O_3$ micro-powder and 3-5 parts by weight of dolomite clinker; the additives of the refractory comprise 12-15 parts by weight of nano alumina sol, 10-15 parts by weight of a dextrin, and 30-40 parts by weight of ethanol; and the lightweight micro-closed-pore corundum composite refractory is prepared by: mixing and wet-grinding the raw materials and the additives with planetary ball mill for 0.5-1 hour to obtain a slurry; placing the slurry in a mold, keeping the mold at room temperature of 15-25° C. for 6-12 hours and then keeping the mold at 60-90° C. for 6-12 hours, and demolding; drying a demolded green body at 110-160° C. for 24-30 hours, and keeping the green body at 1900-2000° C. for 2-4 hours, then the lightweight micro-closed-pore corundum composite refractory is obtained.

It has been proved by experiments that the lightweight micro-closed pore corundum composite refractory prepared by this example has a bulk density of 2.75-2.85 g/cm$^3$, a ratio of closed porosity to total porosity of more than 55%, and an average pore size of 0.1-0.3 µm.

Example 2: Preparation for Lightweight Micro-Closed-Pore Corundum Composite Refractory The raw materials of the refractory comprise 95-97 parts by weight of $\alpha$-$Al_2O_3$ micro-powder and 3-5 parts by weight of dolomite clinker; the additives of the refractory comprise 12-15 parts by weight of nano alumina sol, 5-10 parts by weight of starch, and 30-40 parts by weight of polyvinyl alcohol; mixing and wet-grinding the raw materials and the additives with planetary ball mill for 0.1-0.6 hour to obtain a slurry; placing the slurry in a mold, keeping the mold at room temperature of 15-25° C. for 6-12 hours and then keeping the mold at 60-90° C. for 6-12 hours, and demolding; drying a demolded green body at 150-200° C. for 30-36 hours, and keeping the green body at 1800-1900° C. for 3-5 hours, then the lightweight micro-closed-pore corundum composite refractory is obtained.

It has been proved by experiments that the lightweight micro-closed pore corundum composite refractory prepared by this example has a bulk density of 2.80-2.88 g/cm$^3$, a ratio of closed porosity to total porosity of more than 57%, and an average pore size of 0.2-0.35 µm.

Example 3: Preparation for Lightweight Micro-Closed-Pore Corundum Composite Refractory The raw materials of the refractory comprise 95-97 parts by weight of $\alpha$-$Al_2O_3$ micro-powder and 3-5 parts by weight of dolomite clinker; the additives of the refractory comprise 8-12 parts by weight of nano alumina sol, 10-15 parts by weight of chitin, and 30-40 parts by weight of tert-butyl alcohol; mixing and wet-grinding the raw materials and the additives with planetary ball mill for 0.5-1 hour to obtain a slurry; placing the slurry in a mold, keeping the mold at room temperature of 15-25° C. for 6-12 hours and then keeping the mold at 60-90° C. for 6-12 hours, and demolding; drying a demolded green body at 110-160° C. for 24-30 hours, and keeping the green body at 1900-2000° C. for 2-4 hours, then the lightweight micro-closed-pore corundum composite refractory is obtained.

It has been proved by experiments that the lightweight micro-closed pore corundum composite refractory prepared by this example has a bulk density of 2.80-2.85 g/cm$^3$, a ratio of closed porosity to total porosity of more than 56%, and an average pore size of 0.2-0.4 µm.

Example 4: Preparation for Lightweight Micro-Closed-Pore Corundum Composite Refractory The raw materials of the refractory comprise 95-97 parts by weight of $\alpha$-$Al_2O_3$ micro-powder and 3-5 parts by weight of dolomite clinker; the additives of the refractory comprise 8-12 parts by weight of nano alumina sol, 5-10 parts by weight of mixture of dextrin and starch, and 40-50 parts by weight of mixture of ethanol and polyvinyl alcohol; mixing and wet-grinding the raw materials and the additives with planetary ball mill for 0.1-0.6 hour to obtain a slurry; placing the slurry in a mold, keeping the mold at room temperature of 15-25° C. for 6-12 hours and then keeping the mold at 60-90° C. for 6-12 hours, and demolding; drying a demolded green body at 150-200° C. for 30-36 hours, and keeping the green body at 1800-1900° C. for 3-5 hours, then the lightweight micro-closed-pore corundum composite refractory is obtained.

It has been proved by experiments that the lightweight micro-closed pore corundum composite refractory prepared by this example has a bulk density of 2.90-2.95 g/cm$^3$, a ratio of closed porosity to total porosity of more than 57%, and an average pore size of 0.2-0.4 μm.

Example 5: Preparation for Lightweight Micro-Closed-Pore Corundum Composite Refractory The raw materials of the refractory comprise 97-99 parts by weight of α-Al$_2$O$_3$ micro-powder and 1-3 parts by weight of dolomite clinker; the additives of the refractory comprise 5-8 parts by weight of nano alumina sol, 10-15 parts by weight of mixture of dextrin and chitin, and 30-40 parts by weight of mixture of ethanol and tert-butyl alcohol; mixing and wet-grinding the raw materials and the additives with planetary ball mill for 0.5-1 hour to obtain a slurry; placing the slurry in a mold, keeping the mold at room temperature of 15-25° C. for 6-12 hours and then keeping the mold at 60-90° C. for 6-12 hours, and demolding; drying a demolded green body at 110-160° C. for 24-30 hours, and keeping the green body at 1900-2000° C. for 2-4 hours, then the lightweight micro-closed-pore corundum composite refractory is obtained.

It has been proved by experiments that the lightweight micro-closed pore corundum composite refractory prepared by this example has a bulk density of 2.85-2.94 g/cm$^3$, a ratio of closed porosity to total porosity of more than 55%, and an average pore size of 0.25-0.45 μm.

Example 6: Preparation for Lightweight Micro-Closed-Pore Corundum Composite Refractory The raw materials of the refractory comprise 97-99 parts by weight of α-Al$_2$O$_3$ micro-powder and 1-3 parts by weight of dolomite clinker; the additives of the refractory comprise 5-8 parts by weight of nano alumina sol, 5-10 parts by weight of mixture of starch and chitin, and 40-50 parts by weight of mixture of polyvinyl alcohol and tert-butyl alcohol; mixing and wet-grinding the raw materials and the additives with planetary ball mill for 0.1-0.6 hour to obtain a slurry; placing the slurry in a mold, keeping the mold at room temperature of 15-25° C. for 6-12 hours and then keeping the mold at 60-90° C. for 6-12 hours, and demolding; drying a demolded green body at 150-200° C. for 30-36 hours, and keeping the green body at 1800-1900° C. for 3-5 hours, then the lightweight micro-closed-pore corundum composite refractory is obtained.

It has been proved by experiments that the lightweight micro-closed pore corundum composite refractory prepared by this example has a bulk density of 2.88-3.00 g/cm$^3$, a ratio of closed porosity to total porosity of more than 56%, and an average pore size of 0.25-0.5 μm.

Example 7: Preparation for Lightweight Micro-Closed-Pore Corundum Composite Refractory The raw materials of the refractory comprise 97-99 parts by weight of α-Al$_2$O$_3$ micro-powder and 1-3 parts by weight of dolomite clinker; the additives of the refractory comprise 2-5 parts by weight of nano alumina sol, 10-15 parts by weight of mixture of dextrin, starch and chitin, and 30-40 parts by weight of mixture of ethanol, polyvinyl alcohol and tert-butyl alcohol; mixing and wet-grinding the raw materials and the additives with planetary ball mill for 0.5-1 hour to obtain a slurry; placing the slurry in a mold, keeping the mold at room temperature of 15-25° C. for 6-12 hours and then keeping the mold at 60-90° C. for 6-12 hours, and demolding; drying a demolded green body at 110-160° C. for 24-30 hours, and keeping the green body at 1900-2000° C. for 2-4 hours, then the lightweight micro-closed-pore corundum composite refractory is obtained.

It has been proved by experiments that the lightweight micro-closed pore corundum composite refractory prepared by this example has a bulk density of 2.90-3.00 g/cm$^3$, a ratio of closed porosity to total porosity of more than 55%, and an average pore size of 0.3-0.45 μm.

Example 8: Preparation for Lightweight Micro-Closed-Pore Corundum Composite Refractory The raw materials of the refractory comprise 97-99 parts by weight of α-Al$_2$O$_3$ micro-powder and 1-3 parts by weight of dolomite clinker; the additives of the refractory comprise 2-5 parts by weight of nano alumina sol, 5-10 parts by weight of mixture of dextrin, starch and chitin, and 40-50 parts by weight of mixture of ethanol, polyvinyl alcohol and tert-butyl alcohol; mixing and wet-grinding the raw materials and the additives with planetary ball mill for 0.1-0.6 hour to obtain a slurry; placing the slurry in a mold, keeping the mold at room temperature of 15-25° C. for 6-12 hours and then keeping the mold at 60-90° C. for 6-12 hours, and demolding; drying a demolded green body at 150-200° C. for 30-36 hours, and keeping the green body at 1800-1900° C. for 3-5 hours, then the lightweight micro-closed-pore corundum composite refractory is obtained.

It has been proved by experiments that the lightweight micro-closed pore corundum composite refractory prepared by this example has a bulk density of 2.95-3.05 g/cm$^3$, a ratio of closed porosity to total porosity of more than 55%, and an average pore size of 0.3-0.5 μm.

What is claimed is:
1. A lightweight micro-closed-pore corundum composite refractory, comprising:
   raw materials of the refractory comprise 95-99 parts by weight of α-Al$_2$O$_3$ micro-powder and 1-5 parts by weight of dolomite clinker, and additives of the refractory comprise 2-15 parts by weight of nano alumina sol, 5-15 parts by weight of carbohydrate polymer, and 30-50 parts by weight of organic alcohol,
   the lightweight micro-closed-pore corundum composite refractory is prepared by: mixing and wet grinding the raw materials and the additives to obtain a slurry; placing the slurry in a mold, keeping the mold at 15-25° C. for 6-12 hours and then keeping the mold at 60-90° C. for 6-12 hours, then demolding; drying a demolded green body at 110-200° C. for 24-36 hours, and keeping the green body at 1800-2000° C. for 2-5 hours, and
   the α-Al$_2$O$_3$ micro-powder has an Al$_2$O$_3$ content of >99.2% by weight and a particle size D50 of 0.5-3 μm.
2. The lightweight micro-closed-pore composite refractory of claim 1, wherein the dolomite clinker has a total content of MgO and CaO of >99 wt % and a particle size D50 of 2-7 μm.

3. The lightweight micro-closed-pore corundum composite refractory of claim 1, wherein the nano-alumina sol has a dispersed phase content of >25 wt % and an average particle size of 20-50 nm.

4. The lightweight micro-closed-pore corundum composite refractory of claim 1, wherein the carbohydrate polymer is one or two or more mixtures of dextrin, starch and chitin.

5. The lightweight micro-closed-pore corundum composite refractory of claim 1, wherein the organic alcohol is one or two or more mixtures of ethanol, polyvinyl alcohol, and tert-butyl alcohol.

6. The lightweight micro-closed-pore corundum composite refractory of claim 1, wherein a planetary ball mill is used for the wet grinding.

7. The lightweight micro-closed-pore corundum composite refractory of claim 6, wherein a grinding ball of the planetary ball mill is a corundum ball.

* * * * *